United States Patent [19]
Connors
[11] 3,925,658
[45] Dec. 9, 1975

[54] GRID LATERAL PHOTODETECTOR WITH GAIN

[75] Inventor: William P. Connors, Florissant, Mo.
[73] Assignee: McDonnell Douglas Corporation, St. Louis, Mo.

[22] Filed: Sept. 16, 1974
[21] Appl. No.: 506,228

Related U.S. Application Data
[63] Continuation-in-part of Ser. No. 464,690, April 26, 1974, Pat. No. 3,859,521.

[52] U.S. Cl. ................ 250/211 J; 250/578; 357/32
[51] Int. Cl.[2] .......................................... H01J 39/12
[58] Field of Search ............ 250/211 R, 211 J, 578, 250/203; 357/30, 31, 32

[56] References Cited
UNITED STATES PATENTS
3,210,548 10/1965 Morrison ........................ 250/211 J
3,599,055 8/1971 Bloom ................................. 357/32
3,717,770 2/1973 Dyck et al. .......................... 357/31

*Primary Examiner*—James W. Lawrence
*Assistant Examiner*—D. C. Nelms
*Attorney, Agent, or Firm*—Charles B. Haverstock

[57] ABSTRACT

A grid lateral photodetector having integral gain capability making possible the amplification of generated photocurrents prior to entry of the information in the position determining portion of the detector thereby significantly improving the operating characteristics of the detector especially at low noise levels. The subject photodetector includes a wafer element having an array of phototransistors with a common collector formed by a uniformly diffused semi-conductor region, and an array of diffused semi-conductor material connected to nodal points in a grid resistor array.

19 Claims, 3 Drawing Figures

GRID LATERAL PHOTODETECTOR WITH GAIN

The subject construction is an improvement over the grid lateral photodetector disclosed in copending Continuation-In-Part application Ser. No. 464,690, filed Apr. 26, 1974, now U.S. Pat. No. 3,859,521, issued Jan. 7, 1975 of which Applicant is a coinventor.

Many detector devices are in existence and well known such as those disclosed in the following listed U.S. Pat. Nos. and in the aforesaid pending application:

| | | | |
|---|---|---|---|
| 3,013,158 | McLellan | December | 12, 1961 |
| 3,207,902 | Sandborg | September | 31, 1965 |
| 3,246,161 | Mattare et al | April | 12, 1966 |
| 3,400,273 | Horton | September | 3, 1968 |
| 3,415,992 | Webb | December | 10, 1968 |
| 3,445,667 | Dillman | May | 20, 1969 |
| 3,529,161 | Oostoek et al | September | 15, 1970 |

The construction disclosed in copending application Ser. No. 464,690 (U.S. Pat. No. 3,859,521) is pertinent to the present construction in several respects especially since that construction also includes a grid resistor array. The present detector, however, represents an important and significant improvement over prior art constructions especially because (1) it achieves improved operation at low noise levels, (2) the positional information produced is relatively insensitive to gain variations of the individual phototransistors in the detector portion since gain is achieved before the photocurrent is introduced to the grid resistor array, (3) the position information is obtained by taking the ratio of the currents at four sensing contacts, and (4) the present construction includes means to automatically control the signal range that it presents to follow-on circuits and circuit elements due to the gain mechanism being current dependent, i.e., current gain decreases at the high currents.

It is therefore a principal object of the present invention to provide an improved grid lateral photodetector construction.

Another object is to provide a photodetector construction having improved gain characteristics.

Another object is to make possible significant improvements in the low noise performance characteristics of a grid lateral detector.

Another object is to make positional information available in a detector device relatively insensitive to gain variations of the individual phototransistors employed therein.

Another object is to teach the construction of a detector which automatically controls the signal range that it presents to follow-on circuitry.

Another object is to provide a detector in which the gain mechanism employed is current dependent so that the current gain decreases at high current levels.

Another object is to provide a grid lateral photodetector which overcomes noise limitations which normally occur in the grid resistor array and preamplifier stages connected thereto by incorporating the gain producing means in the detector itself.

Another object is to provide a grid lateral photodetector device having substantially improved signal-to-noise ratio chracteristics.

Another object is to provide a detector in which the current gain decreases as the current increases, a desirable condition in systems where large input dynamic range is encountered.

Another object is to teach the construction and operation of an improved photodetector device which can be made to be sensitive to visible as well as near infrared radiations.

Still another object is to incorporate in a photodetector means for producing dynamic range compression by virtue of non-linear gain mechanisms located in the device itself thereby substantially decreasing the dynamic range requirements of preamplifier stages associated therewith.

These and other objects and advantages of the present construction will become apparent after considering the following detailed specification which describes a preferred embodiment of the subject device in conjunction with the accompanying drawing, wherein.

Figure 1:
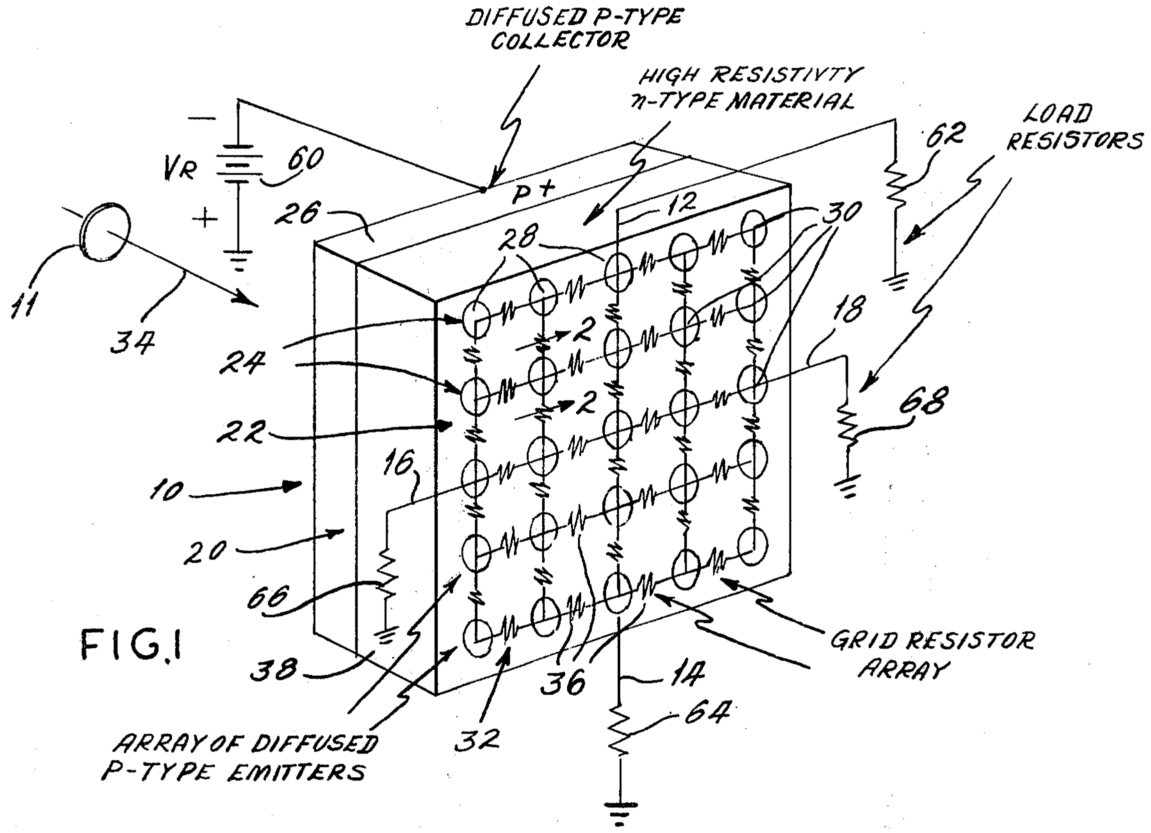
FIG. 1 is a perspective view of a grid lateral photodetector device constructed according to a preferred embodiment of the present invention.

Referring to the drawing more particularly by reference numbers, number 10 refers to a grid lateral photodetector device constructed according to a preferred embodiment of the construction. The photodetector 10 has certain structural and operational features which are somewhat similar to those of the grid lateral photodetector disclosed in Connors et al U.S. patent application Ser. No. 326,114, filed Jan. 23, 1973, later to become copending Continuation-In-Part application Ser. No. 464,690, filed Apr. 26, 1974, and now U.S. letters Pat. No. 3,859,521 and it also has features and characteristics which are not present in the earlier construction and which clearly distinguish it therefrom.

A grid lateral photodetector is a device used primarily to produce information for some purpose such as to determine the position or location of a radiation source such as a source of incident radiation in an observed field of view, said radiation impinging on the active surface of the subject device. This can be radiation from a remote visible, invisible or other radiation source and the radiation is usually focused into a spot on the active surface by means such as lens 11. The position on the photodetector 10 where the light spot or other radiation impinges produces photocurrents in the device which are amplified and then flow through a resistor array or grid which will be described later. The position at which the photocurrents enter the grid resistor array, which is the same position where the incident radiation or light impinges, is determined by means responsive to output currents produced at each of four quadrature sensing electrodes 12, 14, 16 and 18 connected to the respective edges or perimeter of the detector. In the past, substantial noise limitations have been associated with systems employing photodetectors of this type and most of these limitations normally occur in the grid resistor array and preamplifier stages or circuits which are connected to the sensing electrodes. This noise is objectionable and limits the ability of the known devices to be able to identify and make use of the desired responses. Such limitations are overcome in the subject photodetector device which unlike known devices includes internal gain producing means that provide low noise amplification before larger noise sources are encountered, and in the present construction the gain producing means are an integral part of the detector itself. The internal gain producing means are therefore an important feature of the device.

Referring to FIG. 1, the photodetector 10 is shown as including a block, or more accurately a disc or wafer 20 having an array 22 of phototransistors 24 arranged thereon. The phototransistors 24 have a common collector element 26 which is formed by a uniformly diffused p-type semi-conductor region on the side of the device that is exposed to the incident radiation. The detector also has an array of diffused p-type emitter elements 28 which are located at and connected to nodal points 30 in a grid resistor array 32. The phototransistors 24 are constructed and arranged to provide internal amplification of photocurrents that are generated when light or other forms of radiation impinges on the surface of the collector layer 26, and the grid resistor array 32 provides the position information as to where incident radiation 34 impinges. The positional information may be generated in a manner and by means similar to those employed in the detector shown in the aforementioned U.S. Pat. No. 3,859,521.

The gain or amplification achieved in the present construction is achieved before the photocurrents are introduced into the grid resistor array 32, and since the positional information is obtained by a ratio of the currents present at the four sensing electrodes 12–18, the positional information is relatively insensitive to the gain variations of the individual phototransistors 24. This is an important advantage. Furthermore, because amplification occurs in the present device before the flow of photocurrent into the grid resistor array 32 and into any preamplifier means that may be used and that are connected to the electrodes 12–18, a significant improvement in the signal-to-noise ratio is also obtained. This means that the noise requirements of the preamplifiers selected can be greatly relaxes and this is another significant improvement and one which makes the subject detector more easily adaptable for use with more different circuit interfaces and systems.

The grid resistor array 32 is formed by resistor elements 36 preferably constructed by depositing or otherwise applying a resistive material at the desired locations on the surface of a layer 38 shown as being a layer of relatively high resistivity n-type semi-conductor material. The array 22 of phototransistors 24 is then formed on the same layer 38, and all of the phototransistors 24 preferably have the same common collector 26 which, as stated, is formed by the single layer 26 on which the incident radiation 34 impinges. The layer 26 is shown as being a layer of high resistivity p-type semiconductor material located on the opposite side of the wafer 10 from the grid resistor and phototransistor arrays 32 and 22. The emitter elements 28 in the embodiment shown are formed of diffused p-type semi-conductor material (see FIG. 2).

As already explained, the subject device, unlike prior known devices, contains within itself means to produce gain, and the gain produced is produced before the photoresponses or photocurrents reach the signal location part of the device which is the grid resistor portion. Furthermore, the gain produced is gain of the photocurrent generated when radiation impinges on the device and is produced in the phototransistor array 22 which includes the common collector 26. It can therefore be seen that the gain is produced by the phototransistor array 22, and the positional information is produced in the grid resistor array 32. Since both of these conditions are produced in the same device and since the gain is achieved before the current is introduced to the resistor array, and further since the positional information is obtained by taking a ratio of the currents at the four sensing electrodes 12–18, the positional information obtained as aforesaid is insensitive to the gain variations of the individual phototransistors 24. Also, because the gain takes place before the flow of photocurrent into the resistor array 32 and into any preamplifier circuits that may be provided, a significant improvement in the signal-to-noise ratio is expected, and this in turn means that the noise requirements of the preamplifier means selected for use with the device can be substantially relaxed.

Another desirable feature of the subject photodetector construction is that the gain mechanism employed is current dependent which means that the rate of current gain decreases as the amount of current flow increases. This is desirable in systems where relatively large input dynamic range (variation in the intensity of the incident radiation) is encountered since the signal range presented to the preamplifiers will be decreased. Dynamic range as used herein is defined as variations in the output for variations in the intensity of the incident radiation.

Figures 2, 3:
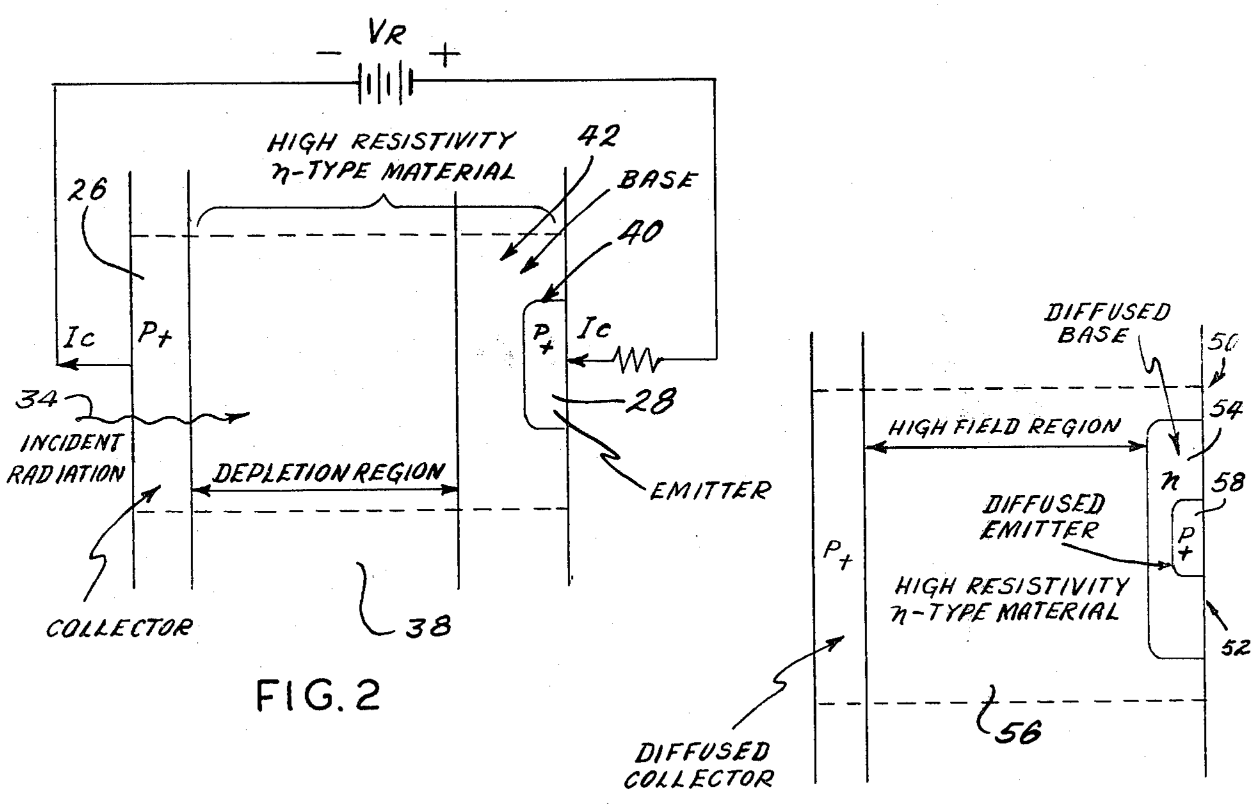
FIG. 2 is a fragmentary cross-sectional view taken on line 2–2 of FIG. 1; and, FIG. 3 is a fragmentary cross-sectional view similar to FIG. 2 but of a phototransistor array fabricated so as to more closely control the individual gain and frequency response.

The operation of the device can be better understood by referring to FIG. 2 where a greatly enlarged cross-section of one of the phototransistors 24 is shown. When incident radiation from a source 34 impinges on the collector layer 26, electron-hole pairs are released therein. The electron-hole pairs generated in the high field, high resistivity n-type region 38 are then separated by the electric field existing in this region, the holes drifting toward the collector region 26 and the electrons toward the base-emitter region designated as region 40. The hole current that is generated is the normal photocurrent associated with a reverse biased PIN diode which is a diode characterized as one having intrinsic high resistivity. The electron current that flows to the emitter 28, on the other hand, provides the means by which the photocurrent is amplified, as will be explained.

If it is assumed that the emitter efficiency is nearly unity as would be the case for a practical device, then the emitter current flow is mainly a hole current (majority carrier current). Therefore, the emitter base junction is forward biased by the electron photocurrent flowing to the emitter, and holes are injected into the base region. In other words, the emitter is forward biased by the electron photocurrent itself. If the ratio of holes reaching the collector 26 to those injected by the emitter is r, then the current in the collector contributed by this mechanism is $rI_e$ where $I_e$ is the emitter current. The total collector current can then be expressed by the equation:

$$I_c = I_p + rI_e$$

where $I_p$ is the normal photocurrent generated in the high field region 26. Furthermore, $I_c = I_e$ for the condition when the transistor base is open circuited, and for this condition a further equation can be written as:

$$I_e = \frac{I_p}{l - r},$$

and in this case the photocurrent is amplified by the factor 1/1-r.

The embodiments shown in the drawing are but several of many possible forms of the subject device, and the drawing shows the structure, including its size and thickness, greatly exaggerated since an actual device will be a relatively small thin wafer-like device with the opposite surfaces relatively large as compared to the thickness. Also the gain of the phototransistors 24 in the structure as shown is sensitive to the width or thickness of the high resistivity depletion or high field region 38. This is because for a given wafer thickness, the thickness of the base region 42 is determined by the thickness of the region 38.

The construction of the phototransistor array 22 can also be modified to provide closer control of the individual gain and frequency response. This can be done by fabricating a modified form of array 50 using PNIP transistors 52 as shown in the construction of FIG. 3. In this construction, the base region 54 of the transistor shown is a diffused n region which has a somewhat lower resistivity than the high field region 56. The base region in the modified structure of FIG. 3 also terminates in a relatively well defined manner as compared to the aforesaid structure. Each of the emitter regions 58 is formed as a diffused p-type region at the nodal points of the grid resistor array (not shown) as in the construction of FIG. 1.

The high resistivity region 56 extends between and surrounds the diffused base regions 54 as in the above structure to provide isolation between the adjacent phototransistor elements of the array. However, if the sheet resistance of the base regions 54 is large compared to the sheet resistance of the resistor array, the base regions could be formed as a uniform layer either as a diffused layer or epitaxially grown.

It is also contemplated to interchange the locations of the semi-conductor regions in the device. For example, a p-type high resistivity region could be used in the places where the n-type high resistivity region 38 is used. If this is done, then the other p and n regions must likewise be interchanged. The technology required for forming the subject layers including the diffused layers or elements is known in the art, and as such is not part of the present invention.

It is contemplated that necessary circuit connections to the various parts of the subject device will be required. Referring again to FIG. 1, it can be seen that the collector layer 26 (which may have a transparent conductive overlayer applied thereto) is biased into a negative potential condition by means of a d.c. source shown as battery 60. Each of the quadrature electrodes 12–18 is similarly connected to respective output means shown as load resistors 62–68. These output connection means may also be connected to other circuit means (not shown). This will depend on the form of the responses or outputs at the electrodes 12–18 and on how these outputs are to be detected and used.

The input incident radiation 34, depending on its form, may pass through the condensor lens 11 which focuses it into a spot that impinges on the surface of the photodector 10. As explained, the impinging incident radiation causes the release of electron-hole pairs which are amplified in the detector and then entered into the grid resistor array 22 at the corresponding location on the detector and used to produce the desired output information. As indicated, the device can be used for many different purposes including in a missile or star tracker, as an object locating device, as a component of a guidance or tracking system, as a means to lock onto and follow an object such as in television or other applications, and it can be used in many other applications as well including optical and electrooptical applications. Furthermore, photodetectors such as the present photodetector can be made to respond to many different radiation forms including visible and invisible radiation, coherent as well as incoherent radiations, near infrared radiations and others. In all of these cases the same desirable advantages and operational characteristics, and more, of photodetectors such as that disclosed in Connors et al U.S. Pat. No. 3,859,521 are achieved while at the same time the present structure produces gain not heretofore provided internally in a photodetector. In this way, the present device also overcomes objectional noise limitations, greatly increases sensitivity by significant orders of magnitude and provides an improved signal-to-noise ratio. Furthermore, the present device as stated has incorporated in it dynamic range compression means which are the result of its non-linear gain mechanism thereby decreasing the dynamic range requirements of preamplifiers and other circuit means which may be selected for connection to the output.

Thus there has been shown and described novel grid lateral photodetector means which include internal gain producing and range compression features and provide improved signal-to-noise characteristics, which photodetector means fulfill all of the objects and advantages sought therefor. Many changes, modifications, variations and other uses and applications of the subject photodetector will, however, become apparent to those skilled in the art after considering this application and the accompanying drawing which discloses several preferred embodiments thereof. All such changes, modifications, variations and other uses and applications which do not depart from the intentions and scope of the invention are deemed to be covered by the invention which is limited only by the claims which follow.

What is claimed is:

1. A grid lateral photodetector comprising a wafer element formed by adjacent layers of different type semi-conductor materials forming a barrier layer therebetween, one of said adjacent layers forming a collector element adjacent to one surface of the device and a second of said layers forming a relatively high resistivity depletion region in said element, a plurality of spaced regions of a selected semi-conductor material formed on the wafer element opposite from the collector forming layer, each of said spaced regions and the adjacent portions of the wafer element forming a region in the element having current amplifying characteristics, current being generated in said element at each location where radiation impinges on the collector element, and means for producing outputs to represent the location where radiation impinges on the collector element including an array of angularly related connected resistive conductors on the surface of said element opposite from the collector element, currents produced in said element when radiation impinges flowing into the array of resistive conductors.

2. The photodetector of claim 1 wherein the resistive conductors include first and second sets of parallel conductors, the conductors of said first set being oriented at an angle to the conductors of said second sets so that the conductors of said respective sets cross each other.

3. The photodetector of claim 1 wherein said spaced regions of a selected semi-conductor material include a diffused layer of a different semi-conductor material attaching each such region to the wafer element.

4. The photodetector of claim 1 wherein the collector element is formed of p-type semi-conductor material, the depletion region is formed of n-type semi-conductor material and the spaced regions are formed of p-type semi-conductor material.

5. The photodetector of claim 4 including a diffused base layer of semi-conductor material positioned between each of the spaced regions and the depletion region.

6. A radiation sensitive photodetector responsive to light radiations emitting from an object in a field of view comprising a semi-conductor element having first and second opposite surfaces, said first surface being oriented to receive radiations from the field of view, means forming a radiation sensitive region adjacent to said first surface including means forming a semi-conductor collector region, a depletion region and a barrier therebetween adjacent to the first surface, a source of bias voltage and means connecting said source to said detector adjacent to said first surface to establish a bias across said barrier and a relatively high electric field region adjacent thereto, means forming a grid of spaced semi-conductor transistor elements including a plurality of spaced semi-conductor emitter regions positioned adjacent to the second surface, other means forming a grid resistor array on said second surface including an ohmic contact located respectively on each of said spaced emitter elements, means forming resistive electrical connections between adjacent ones of said ohmic contacts, a pair of spaced and opposed output electrodes positioned on said second surface adjacent opposite sides of said grid resistor array including means connecting said output electrodes to the grid resistor array adjacent to the respective opposite sides, radiation impinging on the first surface region causing hole-electron pairs to be released and current to flow some of which migrates to the emitter elements opposite from where the radiation impinges and to the grid resistor elements connected thereto and some of the current generated in the grid resistor array flowing to the output electrodes to generate output signals thereat, the amount of current flow to each of said output electrodes varying as a function of distance between where the radiations impinge on the first surface and the respective output electrodes.

7. The radiation sensitive photodetector defined in claim 6 including a diffused p-type semi-conductor layer adjacent to the first surface to face the field of view, and a depletion region formed of relatively high resistivity n-type semi-conductor material positioned adjacent to said p-type layer, said plurality of spaced emitter regions being formed of a relatively high resistive p-type semi-conductor material.

8. The radiation sensitive photodetector defined in claim 7 including a diffused region of semi-conductor material positioned between each of the emitter regions and the high resistivity depletion region.

9. The radiation sensitive photodetector defined in claim 6 wherein said source of bias voltage includes means for establishing a static electric potential between the first and second surfaces and between the emitter regions and the collector region.

10. The radiation sensitive photodetector defined in claim 6 wherein said ohmic contacts and the associated emitter regions are arranged in perpendicular rows and columns, said grid resistor array including connections extending between and connecting adjacent ohmic contacts in the rows and columns, said pair of output electrodes being positioned adjacent to opposite ends of said rows of ohmic contacts, and a second pair of spaced opposed output electrodes positioned adjacent to and in electrical communication with the opposite ends of the columns of ohmic contacts.

11. The radiation sensitive photodetector defined in claim 6 including means for focusing radiation received from the field of view into a spot on said first surface.

12. A photodetector device responsive to radiations received from a radiation source in an observed field of view comprising a semi-conductor element having a body portion formed by adjacent layers of different n and p-type semi-conductor materials, the adjacent layers forming a pn-junction therebetween, said element having first and second opposite surfaces in the plane of the junction, said first surface being adjacent to the junction and oriented to be exposed to receive radiations from the observed field of view, means establishing a bias voltage between the first and second surfaces including a voltage source and means connecting said source to said element, semi-conductor means forming a plurality of spaced emitter regions on said element adjacent to the second surface, means forming an array of connected grid resistor elements on said second surface including an ohmic contact positioned in each of said spaced emitter regions, one of said grid resistor elements being connected between selected pairs of adjacent ones of said ohmic contacts, a pair of spaced output electrodes positioned on said second surface adjacent to opposite sides of the array of grid resistor elements including means connecting said output electrodes to the elements of the grid resistor array adjacent to the respective opposite sides thereof so that currents generated in said semi-conductor element when radiation impinges on the first surface flow to the ohmic contacts and to said output electrodes, the current flow to the respective output electrodes being functionally related to the distance between where the radiation impinges on said first surface and the said respective output electrodes, each of said semi-conductor emitter regions and the adjacent portions of the photodetector element extending therefrom to the first surface operating as a semi-conductor transistor to amplify the current flow produced therein when radiation impinges on the associated portion of the first surface.

13. The photodetector defined in claim 12 wherein the material used in construction of the grid resistor elements has an equivalent sheet impedance that is less than the equivalent sheet impedance of the semi-conductor materials in said semi-conductor element.

14. The photodetector defined in claim 12 including means for focusing radiation received from the field of view into a spot on said first surface.

15. The photodetector defined in claim 12 wherein said output electrodes includes two opposed pairs of output electrodes, the electrodes of one of said pairs being oriented at right angles to the electrodes of said other pair relative to the grid resistor array.

16. A light responsive lateral photodetector comprising a wafer-like body of semi-conductor material having spaced first and second opposite surfaces, means adjacent to said first surface forming a barrier capable of releasing hole-electron pairs to produce current flow in the body when light is directed at said first body surface, means for amplifying the current flow produced in said photodetector including a plurality of spaced transistors formed in said body, each transistor including an emitter portion formed by semi-conductor material positioned at spaced locations adjacent to the second opposite surface, means establishing an electrical bias potential between the first surface and each of said emitter portions whereby each of said emitter portions and the adjacent portion of the wafer-like body forms one of the transistors for amplifying currents generated in said body at locations where light impinges on said first surface, means on said second surface for generating output responses which vary with the location in the device where current is generated due to light impinging, said last named means including a grid structure formed by a plurality of spaced connected conductors positioned on said second surface and extending thereacross in angularly related directions, the equivalent sheet impedance of said conductor elements being substantially less than the equivalent sheet impedance of the semi-conductor materials of said waferlike body, and spaced output electrodes located on the second surface adjacent opposite sides of said grid structure including means forming electric connections between the respective output electrodes and the conductors adjacent thereto, currents being generated in said conductors when light impinges on the first surface of the body and releases hole-electron pairs therein, the current flow at the location where the light impinges being amplified by the transistors in the detector located thereat.

17. The photodetector defined in claim 16 wherein said body of semi-conductor material includes adjacent layers of different types of semi-conductor materials arranged to form a junction therebetween adjacent to said first surface.

18. The photodetector defined in claim 16 wherein said grid structure includes first and second sets of spaced parallel conductors, the conductors of said first set being oriented at an angle relative to the conductors of said second set, and a pair of spaced output electrodes positioned adjacent opposite ends of conductors of each of said sets.

19. The photodetector defined in claim 18 wherein the grid structure includes an ohmic contact positioned on the second surface at the location of each of said spaced transistor portions, said ohmic contacts being located at intersections of the conductors of said first and second sets.

* * * * *